Dec. 12, 1933.   H. L. WILLARD   1,939,154
AUTO BRAKE TESTER
Filed Oct. 6, 1931
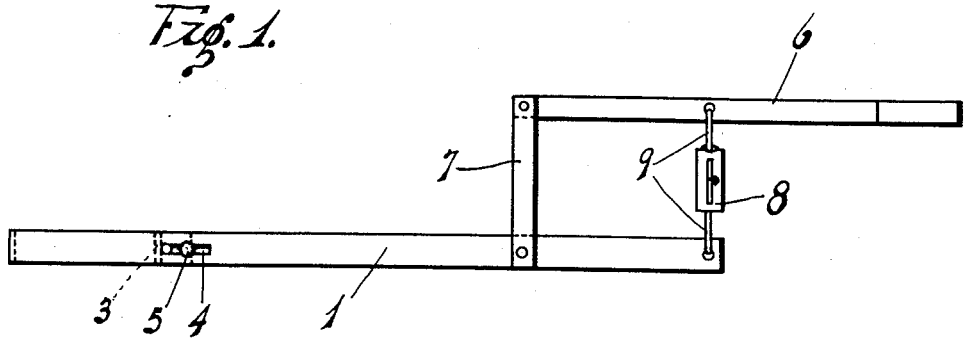
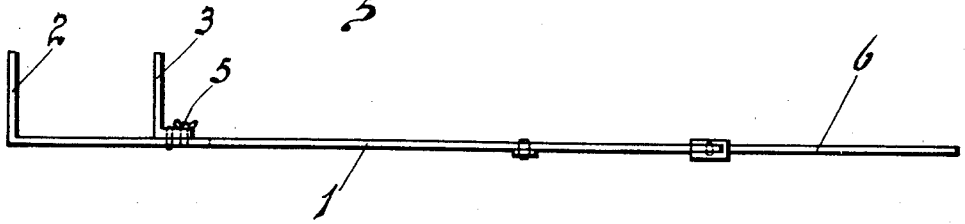
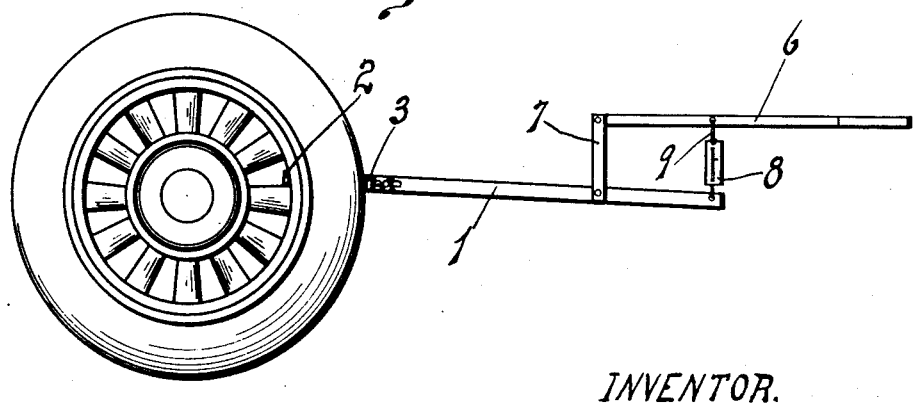
INVENTOR.
HARRY L. WILLARD.
BY
*H. A. Duckman*
ATTORNEY.

Patented Dec. 12, 1933

1,939,154

UNITED STATES PATENT OFFICE 1,939,154

AUTO BRAKE TESTER

Harry L. Willard, Long Beach, Calif.

Application October 6, 1931. Serial No. 567,189

2 Claims. (Cl. 265—1)

This invention relates to a tester for the brakes for an automobile or the like so that the frictional grip of the brakes may be equalized on the various wheels.

An object of my invention is to provide a brake tester which can be quickly and easily applied to the wheel of an automobile or the like. The frictional hold of the brake tested told by a reading on a scale.

Another object of my invention is to provide a brake tester which is simple in construction, inexpensive to manufacture, and effective in use.

Other objects, advantages and features of invention may appear from the accompanying drawing, the subjoined detailed description and the appended claims.

In the drawing

Figure 1 is a side elevation of my brake tester.

Figure 2 is a bottom plan view of the same.

Figure 3 is a side elevation of my tester in position on a wheel.

Referring more particularly to the drawing, the numeral 1 indicates a bar preferably formed of metal and one end of this bar is bent substantially at right angles so as to form a finger 2. A second finger 3 is adjustably mounted on the bar 1 in substantially the following manner: The finger 3 is L shaped and one side thereof bears against the bar. The bar is provided with an elongated slot 4, and a bolt 5 extends through the slot and into the finger 3, thus adjustably securing the finger to the bar.

A wing nut or the like screws on to the bolt so that the bolt can be readily loosened or tightened when necessary. A pin also extends through the slot and into the finger to provide rotation of the finger relative to the bar. If a greater spacing is necessary than that provided by the slot the finger may be rotated through 180 degrees from the position shown in Figure 2, thus providing an additional space between the fingers.

A handle member 6 is mounted on the bar 1 by means of a link 7 which is pivotally secured to one end of the handle and rigidly attached to the bar. A spring scale 8 is mounted between the handle 6 and the bar 1 and is attached by means of wire or rod clips 9—9 to said members.

My brake tester is mounted substantially as is shown in Figure 3 and in testing the brakes the brake pedal of the vehicle is depressed and held in a fixed position. The wheels are jacked up and the fingers 2, 3 are arranged with the latter finger engaging the tire and the other finger extending between the spokes of the wheel and is pressed against the rim. The handle is grasped and pulled upwardly until the wheel starts to rotate. The reading on the spring scale 8 is noted at this time and each of the wheels are acted upon in turn, and the brakes adjusted until the reading on the scale for each wheel is the same as it starts to rotate.

Having described my invention, I claim:

1. A brake tester comprising a bar, a finger integrally formed on one end of said bar, a second finger, said bar having a slot formed therein, a bolt extending through said slot and into the second finger, a handle, a link pivotally secured to said handle and secured to the bar, and a spring scale attached to the handle and to the bar.

2. A brake tester for automobile wheels comprising a bar, a finger integrally formed on one end of said bar, a second finger, said first named finger being adapted to engage the inner surface of the rim of the wheel, and said second finger being adapted to engage the periphery of the tire on the wheel, said bar having an elongated slot formed therein, a bolt extending thru said slot and into the second finger, a handle, a link pivotally attached to the end of the handle and secured to the bar, and a spring scale attached to the end of the bar and to the handle.

HARRY L. WILLARD.